United States Defensive Publication [19] (H) [11] T973,015

Chadwick et al. [43] Aug. 1, 1978

[54] CATHODICALLY PROTECTED POLYOLEFIN COATED PIPELINES

[76] Inventors: Julian Burrell Chadwick, 23 Linwood Rd., Ware, Hertfordshire; Victor George Kendall, 9 Ducketts Wood, Thundrige, Ware, Hertfordshire, both of England

[21] Appl. No.: 836,570

[22] Filed: Sep. 26, 1977

[30] Foreign Application Priority Data

Jun. 29, 1977 [GB] United Kingdom ..... 27190/77

[51] Int. Cl.[2] ..... F16L 58/02

[52] U.S. Cl. ..... 428/36; 428/418; 138/145; 138/143

[57] ABSTRACT

The resistance to stress cracking or cathodic disbonding of an external polyolefin coating on a cathodically protected pipeline, especially a steel pipe for conveying fuel gas at high pressure, is improved by including 1–18%, preferably 4–8%, by weight, based on the polyolefin, of cured epoxy resin in at least the region of the polyolefin coating adjacent the pipe. The concentration of cured epoxy resin may be uniform throughout, or the coating may comprise a primer layer of polyolefin containing the epoxy resin adjacent the pipe and an outer layer of polyolefin containing no epoxy resin.

Suitably cured epoxy resins are described in Kirk-Othmer Encyclopedia of Chemical Technology 2nd Ed. Vol. 8, pp. 294–312. The polyolefin is preferably low-density polyethylene but may also be an ethylene copolymer, high-density polyethylene, polypropylene or a propylene copolymer with up to 20% by weight of ethylene. Its melt flow index is preferably 0.1–200 when used as primer and 0.1–2 otherwise (units g/10 min. measured according to British Standard 2782:Part 1/105C/1976 using 2–16 kg load and for propylene polymers performed at 230° C. instead of 190° C.). Stabilizers, especially antioxidants, pigments such as carbon black, e.g. 1–5% by weight and peroxy cross-linking agents may also be included in the polyolefin compositions.

The powdered composition may be coated by electrostatic spraying onto the heated pipe, e.g. at 190° C. for low-density polyethylene, with possible subsequent application by extrusion or otherwise of polyolefin containing no epoxy resin. It may alternatively be strew-coated onto the pipe heated to a higher temperature, e.g. 320° C.

2 Claims, No Sheets Drawing,

18 Pages Specification

The file of this unexamined application may be inspected and copies thereof may be purchased (849 O.G. 1221, Apr. 9, 1968).